Aug. 7, 1928.

C. R. HARDY 1,680,103

LIQUID MEASURING DEVICE

Filed Dec. 13, 1924

CHARLES R. HARDY, INVENTOR.

BY

ATTORNEY.

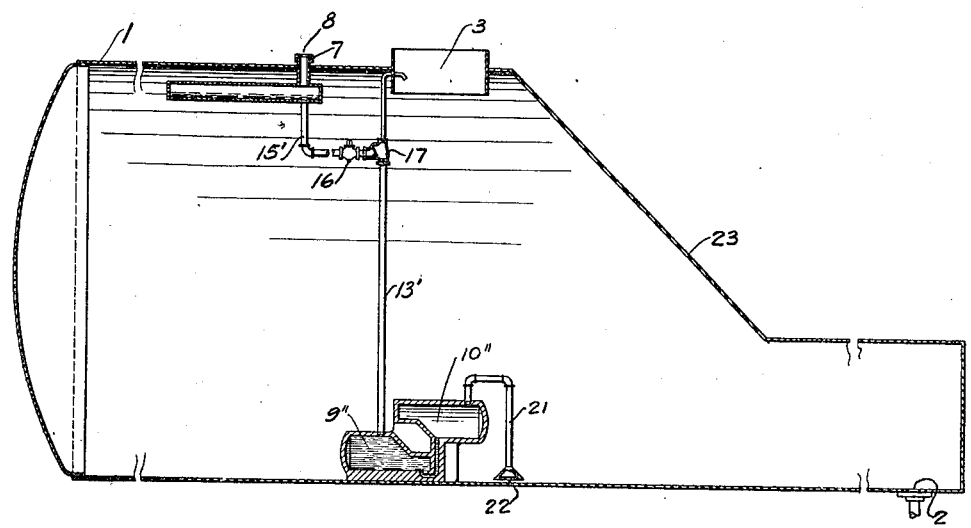

Patented Aug. 7, 1928.

1,680,103

UNITED STATES PATENT OFFICE.

CHARLES R. HARDY, OF MOUNT VERNON, NEW YORK, ASSIGNOR TO THE SUPER-HEATER COMPANY, OF NEW YORK, N. Y.

LIQUID-MEASURING DEVICE.

Application filed December 13, 1924. Serial No. 755,804.

My invention relates to liquid measuring devices and has for its general object the provision of apparatus which will automatically add to a liquid entering a reservoir or other receptacle a predetermined proportion of a second liquid, in order that a definitely proportioned mixture of the two liquids may always be available for withdrawal from the reservoir, regardless of variations both as to time intervals between fillings and amounts added to the reservoir during individual filling operations. Other and further objects will appear as the description proceeds.

While my invention is generally applicable to any case where it is desired to combine two liquids in a reservoir in definite proportions, it is particularly well adapted for use in adding scale preventing or similar compounds, such as are described in the copending application of Julius Alsberg, Serial #731,968 filed August 14th, 1924, to boiler feed water, and especially so in locomotive practice where the feed water supply is carried in a tender, to which raw water is added and the treated feed water withdrawn, intermittently, in varying quantities, and at varying intervals. Moreover, this application of my invention illustrates its adaptability to reservoirs of various irregular shapes, and in this connection the invention will be described as applied to locomotive tender tanks of various forms.

The construction and method of operation of my invention will be explained in the following detailed description of illustrative embodiments taken in conjunction with the accompanying drawings, in which:

Figure 4 is a view similar to Figures 1 and 2, illustrating an installation in still another form of tank.

Figure 1:
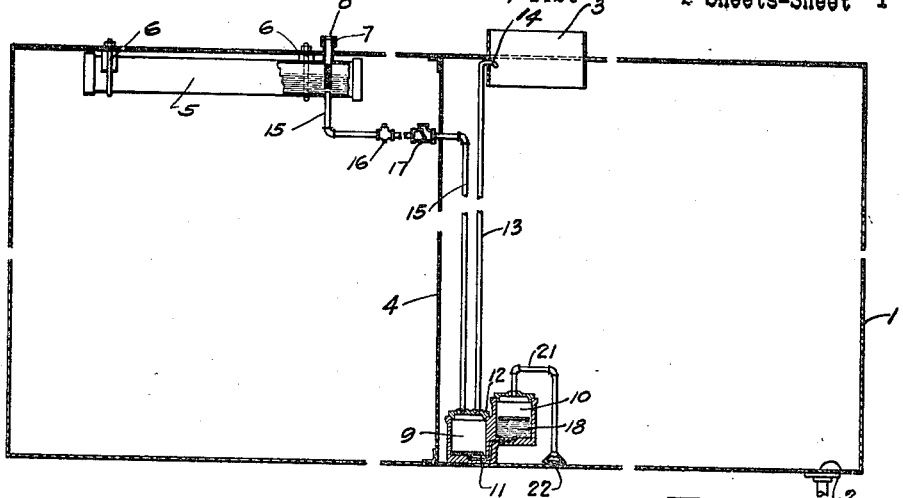
Figure 1 is a longitudinal vertical section through a rectangular locomotive tender tank with my invention installed therein.
Figure 3:
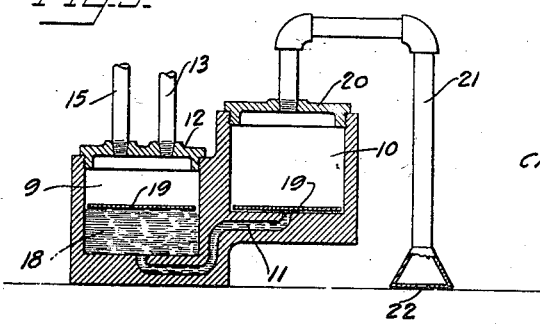
Figure 3 is a detail of the apparatus as installed in the tank shown in Figure 1.

As shown in Figure 1, the tank 1, which is of ordinary form and construction, is provided with the usual outlet 2 at the bottom thereof, filling manhole 3, and swash plate 4. An auxiliary reservoir or tank 5, which contains the compound to be fed to the main body of liquid in the tank 1, is mounted adjacent the top of the tank 1 by any suitable means such as the U clamps 6, and is provided with a filling cap 7, having an aperture 8 therein which vents the tank 5 to the atmosphere. On or near the bottom of the main tank 1 is mounted the metering chamber 9 and a similar chamber 10, the two chambers being connected at or near their bases by the open channel 11. As shown in Figures 1 and 3, the two chambers 9 and 10 are formed by a single casting, but it will be obvious that any form of construction providing two such chambers may be used equally as well. The top of the chamber 9 is closed by a cover plate 12, having an aperture therein in which is screwed or otherwise suitably secured the standpipe 13, which extends upwardly and terminates in the overflow outlet 14, opening preferably into the filling manhole 3 at the top of the tank 1. The auxiliary reservoir 5 is connected with the chamber 9 by the pipe 15, which may be provided with the stop cock 16, and in which is placed the check valve 17, permitting flow from the reservoir 5 into the chamber 9, and preventing return flow from the chamber 9 back into reservoir 5. The inter-communicating chambers, 9 and 10, are partly filled with mercury, indicated at 18, and where the cross sections of the chamber permit, splash plates 19 may be provided in order to minimize the surging due to motion of the locomotive tender in which the apparatus is installed.

The chamber 10 is closed at the top by a cover plate 20 through which extends one end of the pipe 21, the other end of the latter terminating in a small orifice 22 closely adjacent the bottom of the tank 1, and providing free communication between chamber 10 and tank 1.

The operation of the apparatus is as follows: In Figure 1 the main tank 1 is shown empty, while the reservoir 5 contains a quantity of the liquid which is to be added to that in the main tank, and it will be noted the chamber 10 is vented to the atmosphere through the pipe 21 and aperture 22; as is also the reservoir 5 through the aperture 8. Under these conditions the liquid in the reservoir 5 will flow through pipe 15 into the metering chamber 9 and will displace the mercury therein by forcing it into the chamber 10 until an equilibrium is established. This point of equilibrium is established when the differences in the mercury level in chambers 9 and 10 creates a static head just equal to the static head in the standpipe 13, created by the liquid therein and in the reservoir 5.

The liquid from reservoir 5 will also flow into the standpipe 13 until the level therein is the same as that in the reservoir 5, which is at a point slightly below the highest point of pipe 13.

When the tank 1 is filled it will be obvious that the water rising therein will create a static head or pressure on the mercury in the chamber 10 through the communicating pipe 21 and aperture 22, and the pressure thus exerted on the surface of the mercury in the chamber 10 will vary directly as the height of the water level in the tank 1. As the pressure in chamber 10 increases with the rising water level in the tank 1, the mercury in the chamber 10 will be gradually forced through the channel 11 into the metering chamber 9, and will displace some of the liquid with which the chamber has been filled from the reservoir 5. The chambers 9 and 10 are so positioned that some mercury will be contained in each of the chambers 9 and 10 under all conditions; that is, whether the tank 1 be completely filled or entirely empty. If the tank 1 is empty, the mercury level will, as heretofore explained, be as shown in Figure 1, with the mercury in the chamber 10 above the level in chamber 9 a distance sufficient to create a head which will just balance the head of liquid in the reservoir 5. When the tank 1 is full, the mercury will be as shown in Figure 3, with the level in the chambers 9 and 10 approximately the same, due to the fact that the head acting upon the mercury in the chamber 10 and created by the contents of tank 1 is approximately equal to the head exerted on the mercury in the chamber 9 by the liquid in the reservoir 5.

When the mercury in the metering chamber 9 rises, due to the rising water level in tank 1, the liquid in chamber 9 which is displaced by the mercury is prevented from returning to the reservoir 5 by the check valve 17, and is forced through the overflow opening 14 into the tank 1. As water is withdrawn from the tank 1, the falling water level therein relieves the pressure upon the chamber 10 and, as the head or pressure in chamber 9 created by the substantially constant level of liquid in reservoir 5 remains at practically the same value, the mercury level in chamber 9 will recede and additional liquid from the reservoir 5 will enter the top of the chamber 9 to replace that which has been forced through the overflow 14 into the tank 1. Upon an additional supply of water being added to tank 1, the rising water level therein will repeat the action just described, the mercury level in chamber 9 rising in direct proportion to the rise in level in tank 1, and forcing additional liquid from the metering chamber through the overflow 14. It will be seen that the chambers 9 and 10 form, in effect, a reciprocating pump, the piston of which is formed by a confined fluid column comprising in this case the body of mercury 18, which is actuated by variations in the static head of the water in the tank 1, which varies according to the variation in the water level in the tank. When the water level in tank 1 drops due to withdrawal of feed water therefrom, there is produced in chamber 9 the equivalent of a suction stroke, during which fluid is drawn into this chamber from the reservoir 5, and when the water level in tank 1 rises as the tank is filled with raw water, there is produced the equivalent of a discharge stroke, in which the fluid in chamber 9 is discharged into the main tank 1. The horizontal cross sectional areas of the chambers 9 and 10 are so proportioned that equal changes in the mercury level in the two chambers will produce equal volumetric displacements. It will be apparent from the foregoing that whenever water is added to the main tank 1, a quantity of the fluid from the chamber 9 is automatically forced into the main tank, and the quantity of liquid transferred from the metering chamber 9 to the main tank will always be in proportion to the amount of water added to the main tank 1. The desired proportion of liquid to be added to the water in the main tank is obtained by so proportioning the size of the metering chamber 9 that a given fall or rise in the water level in the main tank will cause the desired quantity of liquid from the reservoir 5 to be drawn into the metering chamber 9, or discharged into the main tank, as the case may be.

In the illustrative embodiments, in which a boiler compound is added to raw feed water, the amount added is very small as compared to the quantity in the main tank. For this reason mercury is used in the chambers 9 and 10 as, due to the high specific gravity of the mercury, a variation in the water lever of the tank of several feet will produce a corresponding change in the level of the mercury in the chambers of only a few inches, and consequently, a comparatively small cubic displacement of fluid from the chamber 9 in response to the addition of large quantities of water to the tank 1. In cases where it is desired to add a larger quantity of a liquid, the horizontal sectional area of chambers 9 and 10 may be made larger, or if the proportion is such as to warrant it, a liquid with a lower specific gravity than that of mercury may be employed in order that the same variation in the water level in the tank 1 may produce a greater variation in the liquid level in the chambers 9 and 10; whereby a larger amount of the liquid to be added to the main tank may be alternately drawn into and discharged from the metering chamber 9.

Figure 2:
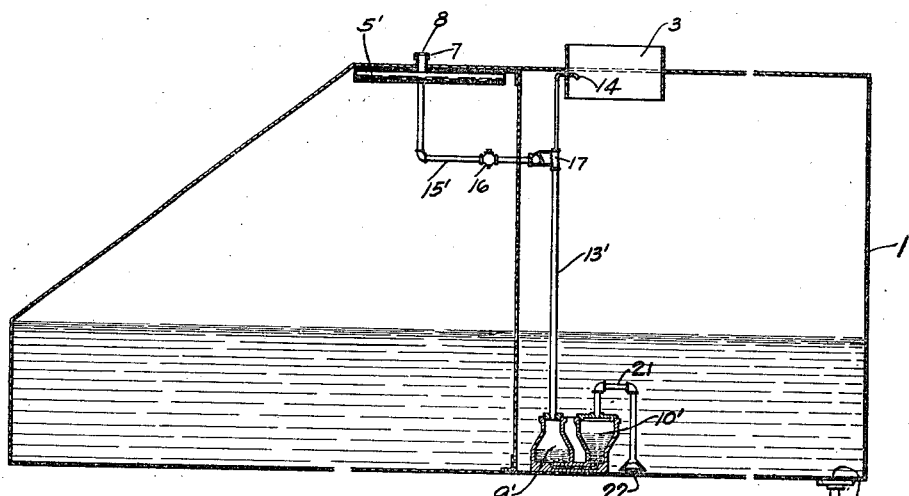
Figure 2 is a similar view with my invention installed in a tank having a varying cross section.

In Figure 2 my invention is shown applied to a tender tank of irregular section, in which the horizontal cross sectional area in the lower portion of the tank is constant but becomes, above an intermediate point, progressively smaller towards the top of the tank. In this form the apparatus is essentially the same as that shown in Figure 1, except for the form of mercury containing chambers 9' and 10', and the auxiliary reservoir 5' all of which have a special form in order to provide an accurately proportioned mixture throughout the working limits of the apparatus.

For the sake of clarity, the apparatus as illustrated in Figure 1 is shown with the inlet 15 to chamber 9, and outlet 13 therefrom as separate conduits, but in actual practice the simpler construction as shown in Figure 2 is employed wherein the inlet pipe 15' connects at an intermediate point to the standpipe 13', which acts both as inlet and discharge conduit for the chamber 9'. Obviously the two forms of piping arrangement are identical in function and operation.

As shown in Figure 2 the water level in the main tank is indicated as being at the point where the horizontal cross sectional area of the tank begins to progressively decrease as the height of the tank increases. From the condition of an empty tank to the condition as shown in Figure 2, equal increments in the rise of water level in the tank represent the addition of equal volumes of water to the tank. Equal increments in the rise of the water level in the main tank also produce equal increments in the change in level of the mercury in the chambers 10' and 9' and from the empty condition of the tank to the condition shown in Figure 2, the equal increments in change in the mercury level in cylinders 10' and 9' have displaced equal volumes of the liquid from the chamber 9', because of the fact that the mercury levels in chamber 10' have fallen and in 9' risen through cylindrical portions of the chambers wherein equal changes in level produce equal displacements in volume. Up to this point the action of the apparatus, while the tank is being filled, is exactly the same as the action of the apparatus as shown in Figure 1. If now, the tank, as shown in Figure 2, has additional water added thereto, equal increments in the rise of the water level will be produced by progressively decreasing amounts of additional water, and in order to maintain the proper proportional amounts of the two liquids mixed in the tank, it is necessary that progressively smaller volumes of liquid be displaced from the metering chamber 9' by equal increments in the rise of the mercury level therein. This is accomplished by making this portion of the chamber 9' in the form of a truncated cone, and the taper of the cone is made so that the decrease in volume per unit of height corresponds to the decrease in volume per proportional unit of height in the main tank 1. In this manner, the proportion between the liquid displaced from the chamber 9' and the quantity of water added to the main tank 1 is maintained as a constant ratio despite the variation in the sectional area of the tank with respect to its height. In order to have the rise in the mercury level in chamber 9' equal to the fall in the mercury level in chamber 10', it is obvious that the volume of the two chambers between the points of maximum and minimum mercury levels considered must be equal. Moreover, as indicated in Figure 2, where chambers of varying sectional area are used, the variation in the sectional area must not only be equal but opposite from each other with respect to the height of the chambers in order that the mercury displaced from one chamber, say chamber 10', by a given drop in the mercury level, will cause an equal rise in the mercury level in chamber 9'.

It will be obvious that the difference in mercury levels in the chambers 9' and 10', in Figure 2, is equal to the difference between the head caused by the water in the main tank acting on chambers 10', and the head caused by the liquid in the reservoir acting on chamber 9'. With this difference in head known, the size and position of the chambers and the quantity of mercury used can be ascertained so that the mercury level in the respective chambers will be as shown in Figure 2, with the mercury in both chambers at the line of demarkation between the portions of constant and varying sectional areas, just as the water in the main tank is at the line dividing the portions of constant and varying sectional area.

In order for the apparatus to function with absolute accuracy, it is necessary that a constant head be maintained on the chamber 9'. Unless this head is constant, and consequently, the difference in head between the chamber 9' and the chamber 10' is constant when the water level in the tank 1 is in any given position (for example, that shown in Figure 2) there will be a variation in the mercury level from that shown in Figure 2, in which case the mercury level would be rising or falling through the portion of the chamber having a varying cross sectional area, while the water in the main tank is rising or falling through the portion having a constant cross sectional area, and vice versa.

In other words, the rising or falling mercury in the chambers would not pass from the constant area cylinder to the tapering portion of the chamber at the same instant that the water in the main tank passed from the constant area lower portion to the diminishing area upper portion of the tank. Obviously, this would introduce an error in the proportioning of the two liquids being mixed, and, in actual practice, a slight error of this character is incurred because of the fact that the level in the reservoir 5' is not always constant, but gradually falls as the liquid to be mixed with the water is used. This error, is, however, made so small as to be negligible by making the reservoir 5' very shallow, and obtaining the necessary volume by making the horizontal cross sectional area as large as may be necessary. When the apparatus is used for the purpose described, in connection with locomotive tenders the reservoir 5' may be made not over 2 inches in depth, which means that the maximum variation in head is plus or minus 1 inch from the mean level in the reservoir. As the total head involved is in the neighborhood of six feet in the ordinary tender, it will be seen that this variation is so small that the head imposed by the liquid in reservoir 5' may be considered for all practical purposes as being constant. In cases where, because of the large quantity of liquid used in the reservoir 5, it is impracticable to keep a substantially uniform level in the reservoir 5', a second storage tank may be employed from which liquid is fed into the reservoir 5' in such a manner that the liquid level therein is always a constant, and by this means a constant head may be maintained upon the metering chamber 9'.

In Figure 4 my invention is shown as applied to a cylindical tender tank of the so-called Vanderbilt type. In this type of tank the forward portion is usually cut away, as at 23, to provide the coal carrying space necessary in the tender, and it is obvious that from this irregularity, and also the generally circular vertical cross section of the tank, that equal differences in water level in the tank may represent widely different volumes of water. In order to apply my invention to a tank of very irregular section, such as this, it is only necessary to properly proportion the chambers 9" and 10" so that the rising or falling mercury level in them will displace volumes which, through any given change in level, corresponds in a definite proportion to the volume of water added or withdrawn from the main tank. In practice, the simplest manner in which this may be accomplished, is to make the chambers 9" and 10" exact duplicates of the main tank, except that they are on a smaller scale. These chambers are then placed in inverted relation to each other in the same manner as has been described in connection with Figure 2, so that the mercury level in each of the chambers is, at any given instant, at a point where the horizontal cross sectional areas of the chambers are equal.

In Figure 4 the apparatus is shown with the main tank filled, and the operation of the device, is identical with that shown in Figure 2. While, as previously pointed out, the simplest manner in which to compensate for irregularities in the main tank 1 is to make chambers 9" and 10" replicas thereof, it will be readily seen that the same object may be attained by the use of reservoirs of other shapes, if the proportions of the reservoirs are computed so that the volume displaced by a given rise or fall in the mercury level will always be a definite proportion of the displacement resulting from the equivalent rise or fall of water level in the main tank.

In order to prevent overflow from reservoirs 5 or 5' directly into tank 1 through the outlet 14, it is necessary for the outlet to be placed at a level slightly higher than the highest possible liquid level in the reservoir and this introduces a slight error which is rendered negligible by making the portion of the outlet pipe above the liquid level in the reservoir of very small diameter and consequently negligibly small volume.

As may readily be seen, if a portion of the contents of tank 1 be drawn off at the same time that water is being added thereto, the change in water level will not be a true measure of the quantity of water added to the tank, and for this reason the accuracy of the measuring apparatus is impaired.

It sometimes happens in practice that feedwater is being withdrawn from a tender during the time that it is being filled, but the rate at which feed water is withdrawn is so small as compared with the filling rate that the change in water level in the tender tank is for all practical purposes a true measure of the quantity of filling water added, and no noticeable inaccuracy in the operation of the measuring device is incurred.

What I claim is:

1. In apparatus of the class described, the combination, with a main receptacle having a varying quantity of liquid therein; of an auxiliary receptacle containing a second liquid, a confined fluid column maintained under a pressure above atmospheric by an amount equal to the difference in head between said liquids, and means whereby said column is actuated by variations in the liquid level of said main receptacle to transfer said second liquid from said auxiliary to said main receptacle in proportion to the quantity of liquid added to said main receptacle.

2. In apparatus of the class described, a main receptacle to which liquid is added and from which liquid is withdrawn, an auxiliary receptacle containing a second liquid, and a fluid pump actuated by variations in the liquid level in said main receptacle, said pump having a metering chamber therein and operating to transfer a pre-determined proportion of said second liquid from said auxiliary tank to said metering chamber as the liquid level in said main tank falls, and to transfer said second liquid in the same pre-determined proportion from said metering chamber to said main tank as the liquid level in the latter rises.

3. In apparatus of the class described, a main receptacle having a varying liquid level therein, an auxiliary receptacle containing a second liquid, a pump having a metering chamber the horizontal sectional area of which is a constant pre-determined fraction of the corresponding horizontal sectional area of said main tank, and means responsive to variations in the liquid in said main tank for automatically admitting said second liquid to said metering chamber and expelling it therefrom.

4. In apparatus of the class described, a main receptacle having a varying liquid level therein, an auxiliary receptacle containing a second liquid, a pump having a metering chamber the horizontal sectional area of which is a constant pre-determined fraction of the corresponding horizontal sectional area of said main tank, and means responsive to variations in the liquid in said main tank for automatically admitting said second liquid to said metering chamber and expelling it therefrom, in constant proportion to the quantity of liquid withdrawn from and added to said main tank.

5. In apparatus of the class described, the combination, with a main receptacle to which liquid is added and from which liquid is withdrawn; of an auxiliary receptacle containing a second liquid, a metering chamber having a non-return inlet connected to said auxiliary receptacle and an outlet opening into said main receptacle, a motive liquid in said chamber below said inlet and said outlet, and means operating to produce a change in the level of said motive liquid in said metering chamber in constant proportion to the change in liquid level in said main receptacle.

6. In apparatus of the class described, the combination, with a main receptacle to which liquid is added and from which liquid is withdrawn; of an auxiliary receptacle containing a second liquid, a metering chamber having a non-return inlet connected to said auxiliary receptacle, a motive liquid in said metering chamber below said inlet, said motive liquid having a specific gravity greater than that of said first named liquid, said main receptacle being in communication with said metering chamber at a point above said motive liquid, and means operating to produce a change in the level of said motive liquid in said chamber in constant proportion to the change in liquid level in said main receptacle.

7. Apparatus of the class described, comprising, in combination, a main liquid containing receptacle, an auxiliary receptacle containing a second liquid to be added to the liquid in said main receptacle, a metering chamber having an inlet through which said second liquid is supplied, an outlet from said metering chamber to said main receptacle, and means operated by the withdrawal of liquid from said main receptacle to admit to said metering chamber an additional quantity of said second liquid proportional to the quantity of liquid withdrawn from said main receptacle.

8. Apparatus of the class described, comprising, in combination, a main receptacle to which a liquid is admitted, an auxiliary receptacle containing a second liquid to be added to the liquid in said main receptacle, a metering chamber having an inlet through which said second liquid is supplied, a motive liquid in said chamber, an outlet from said metering chamber to said main receptacle, and means operated by the addition of liquid to said main receptacle for causing said motive liquid to displace said second liquid from said chamber through said outlet to said main receptacle.

9. Apparatus of the class described, comprising, in combination, a main receptacle to which a liquid is admitted, an auxiliary receptacle containing a second liquid to be added to the liquid in said main receptacle, a metering chamber having an inlet through which said second liquid is supplied, a motive liquid in said chamber, an outlet from said metering chamber to said main receptacle, and means operated by the addition of liquid to said main receptacle for causing said motive liquid to displace from said chamber through said outlet to said main receptacle a quantity of said second liquid proportional to the quantity of liquid added to said main receptacle.

10. A liquid measuring device comprising, in combination, a metering chamber having inlet and outlet means in the upper portion thereof, a second chamber, a connection between said chambers, a motive liquid in said chambers free to flow there between through said connection, non-return means for introducing a liquid to be measured into said metering chamber above said motive liquid and under a substantially constant static head, and means for introducing another liquid into said second chamber above said motive liquid and under a variable static head, whereby variations in the static head of said last named liquid, acting on said motive liquid, operates to pass said liquid to be measured through said metering chamber in pre-determined amounts.

11. In apparatus of the class described, a main liquid containing receptacle, an auxiliary receptacle containing a second liquid, a pair of chambers the lower portions of which are connected and containing a motive liquid free to flow through said connection, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

12. In apparatus of the class described, a main liquid containing receptacle, an auxiliary receptacle containing a second liquid and located substantially at the top of said main receptacle, a pair of chambers located substantially at the bottom of said main receptacle, said chambers being connected at their lower portions and containing a motive liquid free to flow through said connection, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

13. In apparatus of the class described, a main liquid containing receptacle, an auxiliary receptacle containing a second liquid, a pair of chambers with their lower portions connected, located below said auxiliary receptacle and containing a motive liquid free to flow through said connection, said chambers being so proportioned that the ratio of any horizontal sectional area of said chambers to the corresponding horizontal sectional area of said main receptacle is a constant, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

14. In apparatus of the class described, a main liquid containing receptacle, an auxiliary receptacle containing a second liquid, a pair of chambers with their lower portions connected, located below said auxiliary receptacle and containing a motive liquid free to flow through said connection, said chambers being constructed and arranged so that the surface area of said motive liquid in one of said chambers is equal to the surface area of said motive liquid in the other of said chambers at all levels of said motive liquid, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

15. In apparatus of the class described, a main liquid containing receptacle, an auxiliary receptacle containing a second liquid, a pair of chambers with their lower portions connected, located below said auxiliary receptacle and containing a motive liquid free to flow through said connection, said chambers being constructed and arranged so that the surface areas of said motive liquid in said chambers are a constant fraction of the corresponding surface area of the liquid in said main receptacle, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

16. In apparatus of the class described, a main liquid containing receptacle, an auxiliary receptacle containing a second liquid, a pair of chambers with their lower portions connected, located below said auxiliary receptacle and containing a motive liquid free to flow through said connection, said chambers being constructed and arranged so that the surface area of said motive liquid in one of said chambers is equal to the surface area of said motive liquid in the other of said chambers at all levels of said motive liquid, and said surface area being a constant fraction of the corresponding surface area of the liquid in said main receptacle, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

17. In apparatus of the class described, a main liquid containing receptacle, an auxiliary receptacle containing a second liquid, a pair of chambers with their lower portions connected, located below said auxiliary receptacle and containing a motive liquid free to flow through said connection, the corresponding dimensions of said chambers being the same, and one of said chambers being inverted with respect to the other, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

18. In apparatus of the class described, a main liquid containing receptacle, an auxiliary receptacle containing a second liquid, a pair of chambers with their lower portions connected, located below said auxiliary receptacle and containing a motive liquid free to flow through said connection, the dimensions of each of said chambers being a constant fraction of the corresponding dimensions of said main receptacle, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

19. In apparatus of the class described, a main liquid containing receptacle, an auxiliary receptacle containing a second liquid, a pair of chambers with their lower portions connected, located below said auxiliary receptacle and containing a motive liquid free to flow through said connection, the dimensions of said chambers being a constant fraction of the corresponding dimensions of said main receptacle and one of said chambers being inverted with respect to the other chamber, a non-return connection from said auxiliary receptacle to one of said chambers above the motive liquid therein, an outlet from said chamber to said main receptacle, and a connection from the second of said chambers, above the motive liquid therein, opening into said main receptacle at a point adjacent the bottom thereof.

20. In apparatus of the class described, a main liquid containing receptacle, an auxiliary receptacle containing a second liquid, a metering chamber located below said auxiliary receptacle and containing a motive liquid, a conduit connecting said auxiliary receptacle with said metering chamber above the motive liquid therein, a non-return valve in said connection, a second conduit connected to said first named conduit at a point between said metering chamber and said non-return valve and opening into said main receptacle, said second conduit having a portion above the level of said auxiliary receptacle, and means actuating said motive liquid to pass said second liquid through said metering chamber.

CHARLES R. HARDY.